July 30, 1940.  W. S. WALKER  2,209,682
OXY-GAS CUTTING METHOD
Filed Nov. 29, 1938  2 Sheets-Sheet 2
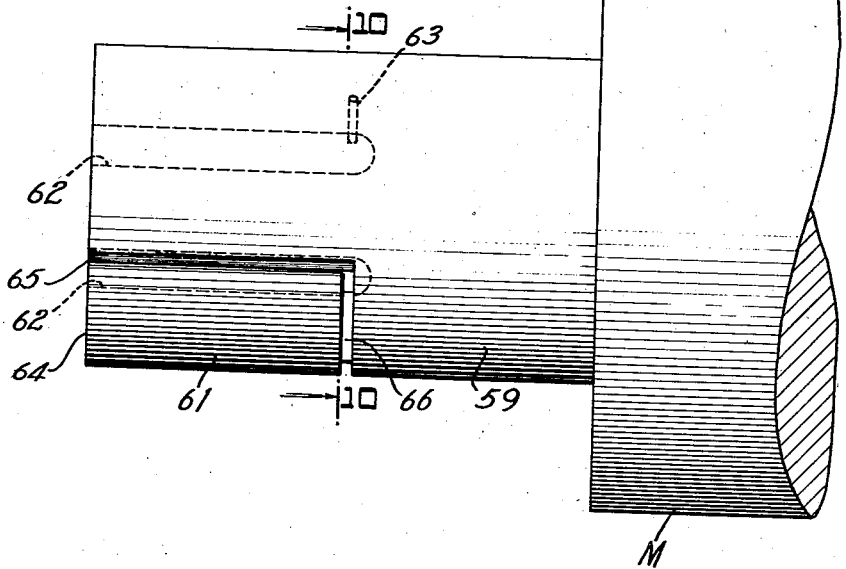
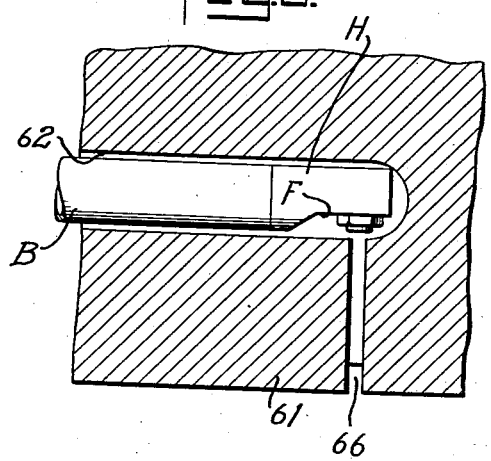
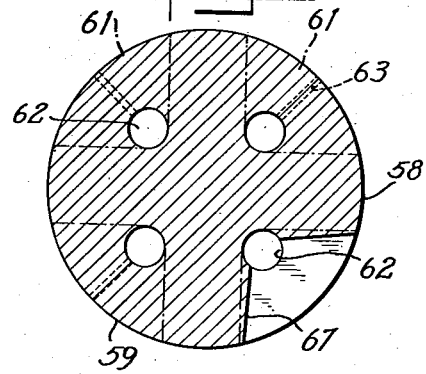
INVENTOR
WESLEY S. WALKER
BY
ATTORNEY Patented July 30, 1940

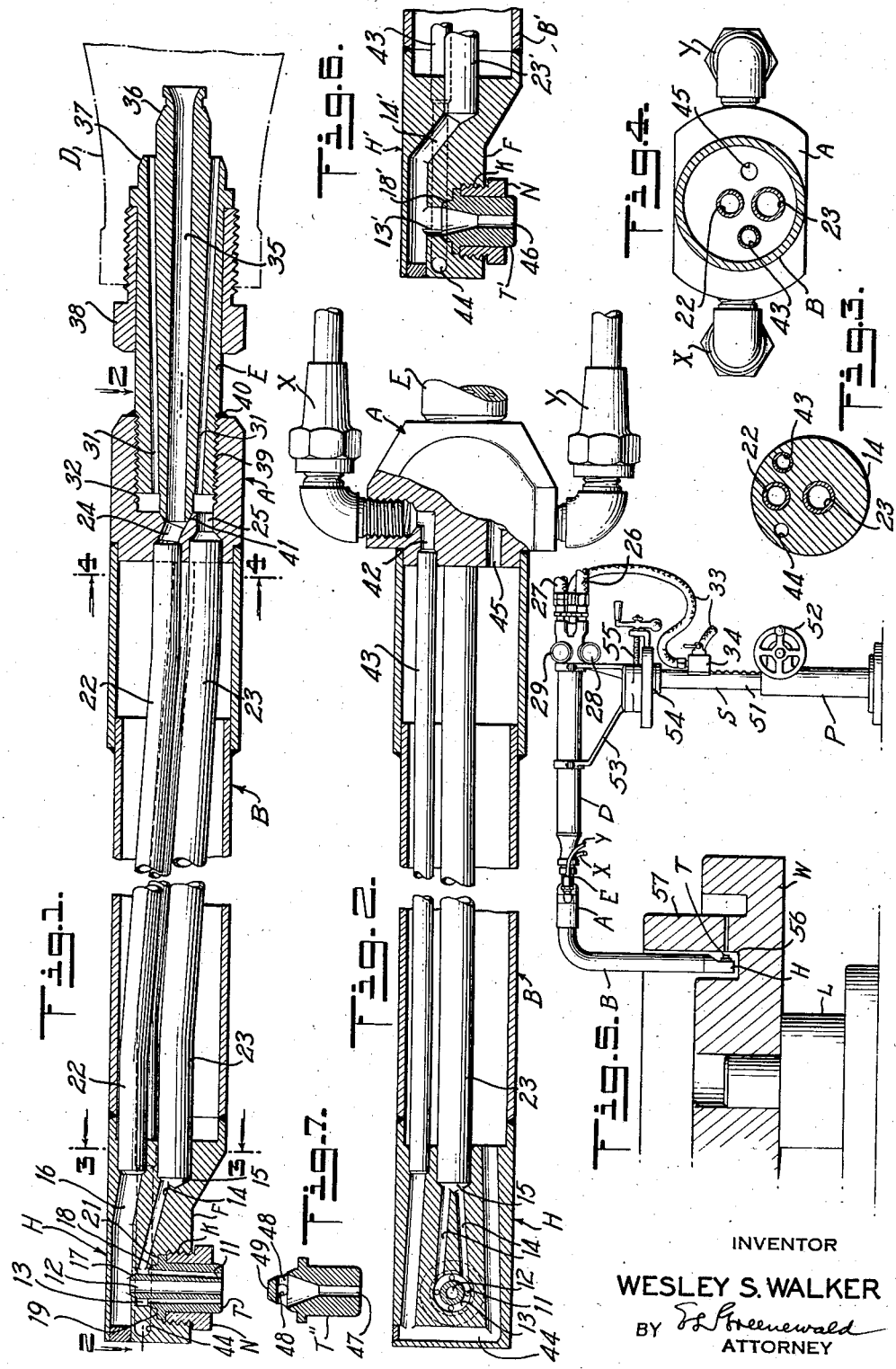

2,209,682

UNITED STATES PATENT OFFICE 2,209,682

OXY-GAS CUTTING METHOD

Wesley S. Walker, Larchmont, N. Y., assignor to The Linde Air Products Company, a corporation of Ohio Application November 29, 1938, Serial No. 242,882

7 Claims. (Cl. 148—9)

This invention relates to an improved method for cutting portions from metal members.

Heretofore, in the practice of oxy-gas cutting of metal members, it has been customary to direct the cutting oxygen jet against an easily accessible outside surface of the metal member so as to begin the cut at said surface, and then to advance the cut from said surface into, and usually entirely through, the member being cut. For example, in severing a steel plate, an oxy-gas cutting medium (a preheating flame and an oxidizing jet) is directed against one surface of the plate, whereupon metal oxidation starts at said surface and progresses through the plate to its opposite surface. Then, by moving the cutting medium relatively to the plate and along the outside line of cutting, a kerf is produced and a portion is severed from the plate.

The procedure just described is impracticable in certain fields of metal fabrication, for example, when it is desired to cut a piece or section from a massive metal body but where the kerf does not extend entirely through the body. In such shaping operations, if the oxy-gas cutting is performed by cutting from the outside surface inwardly but only part way through the body, it is practically impossible to produce a uniform cut of predetermined depth; unsatisfactory blowpipe operation and undercut surfaces result; and molten metal, slag and products of combustion usually are blown and driven into the surfaces of the kerf. In certain other metal fabricating operations which require the severing of a piece from a metal body, especially where the line of cutting is practically inaccessible, prior oxy-gas cutting methods and equipment are also inadequate. Similarly it is often desirable to perform welding, heat-treating or related metallurgical operations in locations inaccessible to previously available equipment.

The principal objects of the present invention are to provide improved oxy-gas cutting procedure, adapted to successfully perform the cutting, welding, shaping and like operations discussed in the next preceding paragraph; and to provide an improved method of cutting outwardly from an internal surface of a metal member to sever a portion from the latter. These and other objects and the principles and novel features of the invention will become apparent from the following description and the accompanying drawings, in which:

Fig. 1 is a view, partly in longitudinal section and partly in side elevation, illustrating an improved oxy-gas cutting blowpipe designed for use in performing the improved cutting method of this invention;

Fig. 2 is a view similar to Fig. 1, but taken on line 2—2 of Fig. 1;

Figs. 3 and 4 are sectional views taken on the lines 3—3 and 4—4, respectively, of Fig. 1; Fig. 3 showing the arrangement of the passages entering the blowpipe head and Fig. 4 showing the arrangement of the passages in the inlet block of the blowpipe;

Fig. 5 is a view illustrating cutting apparatus, and part of an annular metal body set in position to have a portion severed therefrom;

Fig. 6 is a detail sectional view of the delivery end of a welding and heat-treating blowpipe adapted for use with the present invention.

Fig. 7 is a detail sectional view of a welding tip that may be substituted for the cutting tip disclosed in assembled position in Fig. 1;

Fig. 8 is a side view of the wobbler end of a steel roll, showing a portion of said end partly cut out according to the procedure of this invention, to provide a spline;

Fig. 9 is an enlarged detail section of Fig. 8, showing a part of the cutting blowpipe of Figs. 1 and 2 within a starting hole and in position to shape the wobbler; and Fig. 10 is a sectional view on the line 10—10 of Fig. 8, showing the starting holes in the roll and also showing one wobbler quadrant cut out.

In order more fully to explain the improved oxy-gas cutting method of this invention, an oxy-gas cutting blowpipe or nozzle adapted for use in performing the method will first be described. As best shown in Figs. 1 to 4 of the drawings, such a blowpipe or nozzle comprises an elongated hollow casing or tubular body B carrying a blowpipe head H at one end and an inlet block A at its other end. Body B and head H desirably are cylindrical in cross-section and of substantially the same outside diameter, except that the head H has one side recessed or cut away to provide an inwardly offset face F which is substantially parallel to the common axis of the head and body. The head H may be made of solid copper and has a threaded cavity K opening vertically into the face F to receive both a cutting nozzle or tip T and a hollow nut N, the latter having threads engaging those in the cavity to gas tightly but removably secure the tip T to the head H. In order that the blowpipe shall be capable of cutting in very close quarters, especially outwardly from the inside of a narrow or deep recess, the tip T preferably does not project outwardly beyond the extended circumference of the tubular body B. The tip T is therefore considerably shorter than those used on conventional cutting blowpipes; but it has longitudinal passages 11 for discharging combustible gas to provide a preheating flame, and a central passage 12 for discharging an oxygen cutting jet in a direction perpendicular to the face F and to the axis of the blowpipe body B.

The combustible or preheating gas, which may be a mixture of oxygen and acetylene, is distributed to the passages 11 from a chamber 13 in the cavity K, which chamber may communicate at opposite sides thereof with two passages 14 drilled in the head H and opening into a single inlet 15. Another passage 16 in the head delivers cutting oxygen to the inner end of the tip passage 12. Suitable gas tight seats 17 and 18 in the cavity K cooperate with similar seats on the tip T to prevent leakage between the chamber 13 and the passage 16, and from the chamber 13 into the atmosphere. The hollow nut N may engage an annular flange 19 on the tip T to hold the latter tightly in the cavity K, with the inner surface of the flange 19 bearing gas-tightly against an annular shoulder 21 within the cavity.

The flow of cutting oxygen and the preheating mixture to the head H may be controlled by any suitable or well known means, except that the control means must be located far enough back from the head H to prevent interference with the insertion of the blowpipe into a deep or narrow recess in a metal member. As shown, pipes 22 and 23, respectively, conduct oxygen to the passage 16 and a combustible gas to the passages 14; and these pipes extend through the hollow body B and respectively communicate with passages 24 and 25 in the inlet block A. As illustrated in Fig. 5, for example, the main part of a conventional machine cutting blowpipe D, generally similar in construction to the one disclosed in U. S. Patent No. 2,108,820, may be used to supply and control oxygen and acetylene to provide the preheating gas mixture and the cutting oxygen discharged from the tip T. A suitable adaptor E may be substituted for the conventional nozzle or stem of the blowpipe D and gas-tightly couples the outlet end of the latter to the inlet block A. Hoses 26 and 27 deliver oxygen and acetylene through shut-off and mixture-adjusting valves 28 and 29, respectively, to a suitable gas mixer (not shown) in the blowpipe D, and the combustible mixture thus produced is discharged through passages 31 in the adaptor E and into a chamber 32 in the block A. From the chamber 32 the mixture flows through the pipe 23 and passages 14 to the preheating gas passages 11 in the tip T. A branch cutting oxygen passage (not shown) receives oxygen from the hose 33 and through the valve 34; and this branch passage communicates with a central passage 35 in the adaptor E, the flow of such cutting oxygen being controlled by the cutting oxygen valve 34.

The adaptor E is provided with conventional conical seating surfaces 36 and 37 at its inlet end to mate with corresponding seats (not shown) in the head of the cutting blowpipe D, the adaptor E being held securely in position by a coupling nut 38 in the same manner as an ordinary cutting nozzle. The forward end of the adaptor E is threaded for connection with a threaded bore 39 in the inlet block A, the joint being made sufficiently tight that a forwardly projecting seating surface 41 seals the passage 24 from the chamber 32. A deposit of solder 40 or the like, provides a gas-tight seal between the chamber 32 and the atmosphere.

The heat incidental to and generated during operation of the blowpipe requires adequate cooling of the head H and body B in order that the cutting or welding operation may proceed satisfactorily while said head and body are confined in a deep or narrow recess and while subjected to the very high temperatures therein. As best shown in Fig. 2, a cooling medium such as water may be supplied through an inlet fitting X to a duct 42 in the inlet block A. A pipe 43, which extends through the hollow body B, connects the duct 42 to one branch of U-shaped passage 44 formed in the head H around the axis of the cavity K. The discharge branch of the U-passage opens into the interior of the body B which is connected by a duct 45 in the block A to an outlet fitting Y. Thus, cooling water may be circulated through the pipe 43, and around the head H, returning through the hollow body B where it courses around the outside of water pipe 43 and gas pipes 22 and 23, thereby thoroughly cooling all parts of the blowpipe which are inserted into and subjected to the heat developed within a deep or narrow recess.

Fig. 6 discloses the manner in which principles of the present invention may be incorporated in an improved welding or heating blowpipe. The same general construction is employed with the exception that a welding tip T', having a single heating-gas orifice 46, is secured within the head H'. An oxy-acetylene mixture is delivered to the orifice 46 through a pipe 23', passage 14', and chamber 13' as shown in Fig. 6. A conical seat 18' formed in the head H' engages a corresponding seat on the tip J' to seal the chamber 13' from the atmosphere, the tip T' being held in position within the cavity K by a hollow nut N, as previously described. Suitable provision is made for securing the body B' to the head of a conventional welding blowpipe (not shown) by means of an adaptor of the general type shown in Fig. 1, in order that the inflammable mixture, normally discharged from such welding blowpipe, may be conducted to the pipe 23'. Under these circumstances no provision is made for cutting gas, the blowpipe functioning solely as a heating or welding implement.

If desired, the blowpipe shown in Fig. 1 may be employed for welding and heating operations by shutting off the supply of cutting oxygen. In order to more properly concentrate the flame, however, and to insure against accidental flow of cutting oxygen, a tip T'', of the type shown in Fig. 7 may be employed with the cutting blowpipe shown in Fig. 1, to adapt it for welding and heating purposes. The tip T'' comprises a body adapted to be held within the cavity K by the nut N, which body is provided with a central heating-gas orifice 47 communicating through openings 48 with the chamber 13. A plug 49 engages the conical seat 17 of the head H effectively blocking the flow of cutting oxygen even though the cutting-oxygen valve is open. Accordingly, with the tip T'' in position, the blowpipe of Fig. 1 functions as a welding blowpipe. Obviously, similar tips with larger or smaller delivery orifices may be employed to alter the capacity of the blowpipe. The foregoing blowpipe is described and claimed in application of Herbert W. Cowin, Serial No. 302,829, filed November 4, 1939, a division of the present application.

The manner in which the blowpipe may be employed for use in inaccessible locations, and for performing cutting operations wherein the kerf projects only partly through a complete body section, is disclosed in Figs. 5, 8, 9, and 10. In Fig. 5, the blowpipe body B, bent to form a right angle is shown supported by a suitable pedestal P while cutting the riser from a large casting. A support S, provides for vertical adjustment with respect to the pedestal P, and preferably comprises a telescoping shaft 51 which may be raised and lowered by rack and pinion elevating means 52. Blowpipe clamping means 53 is mounted to the shaft 51 by a swivel connection 54, and a transverse slide 55 is provided for making lateral adjustments. The head of the blowpipe body B is shown inserted in the narrow, inaccessible, and relatively deep recess 56 of a work piece W, for example, a cast wheel, in order to cut through the adjoining massive riser 57, formed during the casting operation. The wheel W is supported by a turntable L adapted to provide relative movement along the path of cut between the work W and the blowpipe body B.

With the blowpipe mounted as shown in Fig. 5, a starting zone on the riser 57 is heated to the ignition temperature by the preheating jets from the tip T, after which the work is pierced by a relatively light stream of cutting oxygen admitted through the tip T by partially opening the valve 34. Upon completion of the piercing operation, a full stream of cutting oxygen is applied, and relative movement between the work W and the blowpipe B instituted by rotating the turntable L at the proper speed to maintain a cut. By mounting the blowpipe body B upon the carriage of a machine of the type shown in U. S. patent to H. W. Jones, No. 2,054,425, straight line cutting operations may be similarly performed in elongated relatively inaccessible recesses or the like.

Referring now to Figs. 8, 9, and 10, the blowpipe body B is shown adapted for use in performing an improved cutting operation, such as might be useful in forming grooves, channels or the like. Specifically the improved cutting method is shown in connection with the formation of splines 58 upon the driving or wobbler end 59 of a mill roll M, such rolls being cast in large sizes for rolling structural shapes, etc., in steel mills. In order to properly connect the roll M with a source of driving power, one or both ends is ordinarily splined by removing quadrants 61, indicated by broken lines in Fig. 10. Heretofore the quadrants were removed at great expense by slow machining and grinding operations. According to the present method the quadrants are successively removed by progressively projecting an oxidizing jet outwardly from longitudinally extending bores 62 best seen in Fig. 10.

Preferably, though not necessarily, small sighting holes 63 are first drilled radially inward from four points symmetrically located about the periphery of the wobbler end 59 at the desired distance from the end face 64 of the roll M. A plurality of longitudinally extending bores, cavities or starting holes 62 are then progressively extended inwardly from the end face 64 in a direction parallel to the roll axis until the proper depth has been reached as determined with the aid of the sighting holes 63. Although the bores 62 may be formed by drilling and reaming or similar machining operations, preferably use is made of a conventional oxygen lance, which is highly adapted for rapidly forming deep cylindrical bores of the type shown, preferably of a diameter slightly in excess of the diameter of the extended body B. With the bores 62 located substantially at the apices of the sectors to be removed as shown in Fig. 10, the respective quadrants 61 may be removed by inserting the blowpipe body B within each bore and making the required circuitous oxidizing gas cut outwardly from the bore to the periphery of the wobbler end, in order to sever the quadrant from the roll.

Although the sequence followed in making the severing cut may vary without departing from the principles of the invention, satisfactory results have been obtained by starting the severing cut at the face of the roll 64, that is, at the mouth of the bore, with the tip T pointing outwardly so as to project the cutting stream in a substantially horizontal direction outwardly from the bore to the periphery of the wobbler end 59. The blowpipe body B is then moved slowly lengthwise of the bore so as to form the kerf 65 as shown in Fig. 8, the inward motion being stopped when the head of the blowpipe body reaches the bottom or base of the bore, as shown in Fig. 9. The transverse end cut may then be made as by providing relative rotary or arcuate motion between the roll M and the blowpipe body, such as might be obtained by turning the blowpipe body approximately 90° about the axis of the bore, after which the flame-cutting jet issues in a vertical direction from the tip T. The severing operation is completed by slowly withdrawing the blowpipe body from the bore 62 while progressively forming the vertical cut, resulting in the face 67. Fig. 10 illustrates the wobbler end after the completion of one severing cut, effecting the removal of the lower right-hand quadrantal sector. The operation is repeated until all desired sectors are removed, after which the wobbler may be finished by machining the cut portions to the shape illustrated in dot and dash lines in Fig. 10.

Alternately, the operation may be performed by initiating the severing cut at the position shown in Fig. 9, by projecting the flame-cutting jet through the sighting hole 63, turning the blowpipe body 45° so that the jet issues either horizontally or vertically, and slowly withdrawing the blowpipe body B from the bore 62 to form the longitudinal cut. The body B must then be inserted within the bore a second time to perform the remaining step of the severing operation. In any case advantage is taken of the projection of a gaseous oxidizing jet in an outward direction from an inner surface of a metal body such as is presented by a bore, cavity, or similar inaccessible recess, while advancing along paths defining the shape or contour of the removed portion. Although blowpipe bodies B have been made according to the present invention with a diameter of one inch, smaller sizes may be constructed in proportion for light duty and for use in especially restricted areas. According to the present method, it is possible to make flame-cuts extending from the outer surface to a predetermined depth within the body, a procedure which cannot be performed successfully by directing a cutting jet inwardly from the outer surface.

Various modifications of the herein disclosed blowpipe and method obviously will be suggested to those skilled in the art by the foregoing description, which modification may be enjoyed without departing from the principles of the invention or sacrificing its advantages.

I claim:

1. A method of removing a portion from a ferrous metal body, comprising forming a bore in said body; and advancing an oxidizing cutting jet progressively along and across said bore in a path defining the contour of the portion to be removed, said jet projecting outwardly from said bore to the outer surface of said body, to thereby sever the portion between said bore and said surface.

2. A method of shaping metal comprising boring a cavity into a body of metal; and progressively applying a flame-cutting jet to successive portions of the wall of said cavity, said jet projecting through said wall outwardly from the cavity to the outer surface of said body, said jet moving along spaced paths extending generally longitudinally of said cavity and along connecting paths to form a continuous cut in said body of metal.

3. A method of forming wobblers on cast metal rolls by removing sectors therefrom, comprising forming longitudinal bores in the ends of the rolls at points corresponding substantially with the apices of the metal sectors to be removed; introducing a cutting blowpipe into said respective bores; and flame cutting the metal of the sectors to be removed outwardly from the said bores.

4. A method of forming a groove in a body of metal comprising oxygen-lancing a substantially cylindrical cavity in said body of metal below the surface thereof; applying a flame-cutting jet progressively within said cavity, said jet issuing outwardly against the wall of said cavity and through the surface of said body to form a cut therein; swinging said jet in an arc when said jet reaches the end of its travel in said cavity; and progressively withdrawing said cutting jet from said cavity while said jet forms a second cut through the wall of said cavity along a path separated from the first cut.

5. In a method of removing a portion from a ferrous metal body, the steps comprising forming a cavity in said body; and forming a plurality of spaced flame-cuts extending from the mouth of said cavity to substantially the base thereof, said cuts being formed by projecting flame-cutting jets outwardly from said cavity to the surface of said metal and by moving said jets progressively along said cavity.

6. A method of removing a portion from a ferrous metal body comprising forming a sighting hole inwardly from the surface of said metal body; boring a cavity into said body so as to intercept said sighting hole when said cavity has reached a predetermined depth; and forming a plurality of flame-cuts outwardly from said cavity to the surface of said metal, to thereby sever from the body the portion between said cavity and the surface.

7. A method of removing a portion from a ferrous metal body, comprising forming a hole in said body; and flame severing the portion between said hole and an outer surface of said body by projecting an oxidizing cutting jet outwardly from said hole to said surface, comprising advancing said jet longitudinally of said hole along a path between the mouth and base of said hole to form a first cut therein, thereupon moving said jet transversely of said cut to form a second cut in said body, and then retracting said jet from said hole along a path extending longitudinally between the mouth and base of said hole in separated relation to the first cut, all while projecting said oxidizing cutting jet outwardly from said hole to said surface.

WESLEY S. WALKER.